US012246938B2

(12) United States Patent
Takemura

(10) Patent No.: US 12,246,938 B2
(45) Date of Patent: Mar. 11, 2025

(54) SHEET STORAGE APPARATUS

(71) Applicant: Glory Ltd., Himeji (JP)

(72) Inventor: Yoichi Takemura, Hyogo (JP)

(73) Assignee: GLORY LTD., Himeji (JP)

( * ) Notice: Subject to any disclaimer, the term of this patent is extended or adjusted under 35 U.S.C. 154(b) by 134 days.

(21) Appl. No.: 18/108,033

(22) Filed: Feb. 10, 2023

(65) Prior Publication Data

US 2023/0249934 A1 Aug. 10, 2023

(30) Foreign Application Priority Data

Feb. 10, 2022 (JP) ................................ 2022-019890

(51) Int. Cl.

*B65H 29/46* (2006.01)
*B65B 7/02* (2006.01)
*B65B 25/14* (2006.01)
*B65H 31/30* (2006.01)
*G07D 11/12* (2019.01)
*G07D 11/13* (2019.01)

(52) U.S. Cl.

CPC ............... *B65H 29/46* (2013.01); *B65B 7/02* (2013.01); *B65B 25/14* (2013.01); *B65H 31/309* (2013.01); *G07D 11/12* (2019.01); *G07D 11/13* (2019.01); *B65H 2301/422548* (2013.01); *B65H 2701/1912* (2013.01)

(58) Field of Classification Search

CPC ........ B65H 29/46; B65H 2301/422548; B65H 31/309; B65H 2701/1912; B65H 31/06; B65B 43/54; B65B 7/02; B65B 25/14; B65B 5/106; B65B 5/067; G07D 11/12

See application file for complete search history.

(56) References Cited

U.S. PATENT DOCUMENTS

| | | | | |
|---|---|---|---|---|
| 9,117,323 | B2 * | 8/2015 | Brexel .................. | G07D 11/12 |
| 9,129,463 | B2 | 9/2015 | Langhuber et al. | |
| 2012/0067011 | A1 | 3/2012 | Holland-Letz et al. | |
| 2018/0305048 | A1 | 10/2018 | Nishimura et al. | |

FOREIGN PATENT DOCUMENTS

| | | | | |
|---|---|---|---|---|
| EP | 0852279 | A2 * | 7/1998 | ......... B65D 33/2585 |

OTHER PUBLICATIONS

Extended European search report issued on Jun. 20, 2023, in corresponding European patent Application No. 23155764.6, 9 pages.

* cited by examiner

*Primary Examiner* — Jeremy R Severson
(74) *Attorney, Agent, or Firm* — XSENSUS LLP

(57) ABSTRACT

Provided is a sheet storage apparatus capable of storing as many sheets as possible in a storage bag. The sheet storage apparatus according to the present disclosure includes a moving section that moves a sheet to a back side, in a storing direction, of a storage bag fixed so that the storing direction is horizontal or closer to horizontal than to vertical; a first storage bag support that supports a bottom surface of the storage bag; and a second storage bag support that is positioned on the back side from the first storage bag support in the storing direction and supports the bottom surface of the storage bag at a position lower than the first storage bag support.

19 Claims, 9 Drawing Sheets

SHEET STORAGE APPARATUS

CROSS-REFERENCE TO RELATED APPLICATION

This application claims the benefit of foreign priority to Japanese Patent Application No. 2022-019890, filed on Feb. 10, 2022, the disclosure of which is incorporated herein by reference in its entirety.

TECHNICAL FIELD

The present disclosure relates to a sheet storage apparatus that stores sheets.

BACKGROUND ART

Sheet storage apparatuses for storing sheets, such as securities and banknotes, have been widely used. For example, Patent Literature (hereinafter, referred to as PTL) 1 discloses an apparatus that feeds banknotes into a horizontally-placed storage bag and stacks the banknotes upright (in an upright state) in the storage bag.

CITATION LIST

Patent Literature

PTL 1
U.S. Pat. No. 9,129,463

SUMMARY

Solution to Problem

A sheet storage apparatus according to the present disclosure comprises a moving section that moves a sheet to a back side, in a storing direction, of a storage bag fixed so that the storing direction is horizontal or closer to horizontal than to vertical; a first storage bag support that supports a bottom surface of the storage bag, and a second storage bag support that is positioned on the back side from the first storage bag support in the storing direction and supports the bottom surface of the storage bag at a position lower than the first storage bag support.

DESCRIPTION OF EMBODIMENTS

Figure 1:
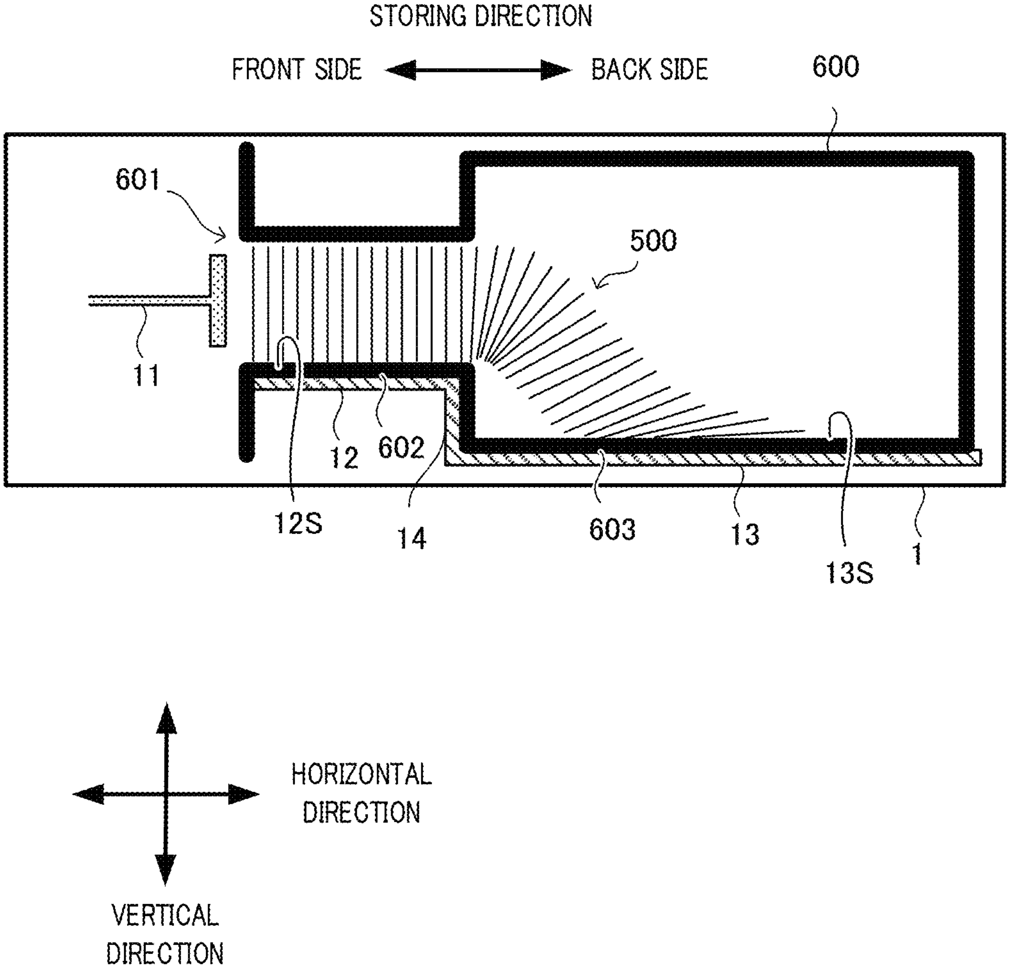
FIG. 1 is a diagram for illustrating a configuration comprised by a sheet storage apparatus according to Embodiment 1 of the present disclosure.

In the technique disclosed in PTL 1, the bottom surface of a bag is attached so as to cover a frame that is provided at an entrance portion of a support frame, and sheets are stored into the bag by the sheets contacting the bottom surface and pressing the support frame toward the back.

There is a need for a sheet storage apparatus to store as many sheets as possible in a storage bag. According to the technique disclosed in PTL 1, however, the support frame is formed to fit the size of sheets and the amount of sheets storable in a storage bag is limited.

It is an object of the present disclosure to provide a sheet storage apparatus capable of storing as many sheets as possible in a storage bag.

In the sheet storage apparatus according to the present disclosure, a step section may be provided between the first storage bag supporting section and the second storage bag supporting section. The step section may be provided so that its height is higher than half the height of the sheet to be stored in an upright state.

In the sheet storage apparatus according to the present disclosure, the first storage bag supporting section, the second storage bag supporting section, and the step section may integrally form a single supporting member.

The sheet storage apparatus according to the present disclosure may further comprise a sealing section that is placed on a front side from the step section in the storing direction and seals the storage bag.

The sheet storage apparatus according to the present disclosure may further comprise a sheet supporting section that supports the sheet to be stored in the storage bag so that the sheet is in an upright state; and a control section that moves the sheet supporting section based on a storage amount of the sheet.

In the sheet storage apparatus according to the present disclosure, the control section may move the sheet supporting section to a farthest back position within a movable range of the sheet supporting section when the sheet supporting section reaches a predetermined position with respect to the first storage bag supporting section in the storing direction.

In the sheet storage apparatus according to the present disclosure, the control section may move the sheet supporting section to a farthest back position within a movable range of the sheet supporting section before the sheet is stored in the storage bag.

In the sheet storage apparatus according to the present disclosure, the control section may selectively perform first movement control and second movement control, the first movement control being control for moving the sheet supporting section in accordance with the storage amount of the sheet in the storage bag, the second movement control being control for moving the sheet supporting section to a farthest back position within a movable range of the sheet supporting section before the sheet is stored in the storage bag.

The sheet storage apparatus according to the present disclosure may further comprise an accumulating section that comprises an accumulating surface for accumulating the sheet before stored in the storage bag so that the sheet is in the upright state, and that is placed on a same plane as a first supporting surface of the first storage bag supporting section and on a front side from the first supporting surface in the storing direction, the first supporting surface supporting the bottom surface of the storage bag.

In the sheet storage apparatus according to the present disclosure, the first storage bag supporting section and the second storage bag supporting section may be removable from the sheet storage apparatus, and a third storage bag supporting section may be attachable, the third storage bag supporting section supporting, by a third supporting surface that is a single plane, the bottom surface of the storage bag supported by the first storage bag supporting section and the bottom surface of the storage bag supported by the second storage bag supporting section.

In the sheet storage apparatus according to the present disclosure, the second storage bag supporting section may be movable to a position where a second supporting surface of the second bag supporting section is on a same plane as the first supporting surface, the second supporting surface supporting the bottom surface of the storage bag.

In the sheet storage apparatus according to the present disclosure, the control section may perform the first movement control in a case where the third storage bag supporting section is attached or when the second supporting surface has moved to a position on a same plane as the accumulating surface and the first supporting surface.

The sheet storage apparatus according to the present disclosure may further comprise a detecting section that detects whether a shape of the storage bag is in a first form or a second form, the first form being a form in which the back side in the storing direction is expanded from the front side, the second form being a form in which the front side and the back side in the storing direction have a same height, wherein, the control section may perform the first movement control in a case where the shape of the storage bag is detected to be in the second form.

The sheet storage apparatus according to the present disclosure may further comprise an operation unit where it is selectable whether to cause the control section to perform the first movement control or the second movement control.

According to the present disclosure, it is possible to store as many sheets as possible in a storage bag.

Hereinafter, embodiments of the present disclosure will be described with reference to the accompanying drawings. However, for example, detailed description of already well-known matters, repeated description of substantially the same components, and the like may be omitted. The same reference signs are assigned to the same components in the embodiments, and the repeated description may be omitted.

Embodiment 1

FIG. 1 is a diagram for illustrating a configuration comprised by a sheet storage apparatus 1 according to Embodiment 1 of the present disclosure. As illustrated in FIG. 1, the sheet storage apparatus 1 comprises a moving section 11, a first storage bag supporting section 12, and a second storage bag supporting section 13.

In the sheet storage apparatus 1, a storage bag 600 is horizontally fixed to store sheets 500. The sheets 500 are, for example, banknotes, securities, and the like. The storage bag 600 is a bag made of, for example, resin, paper, cloth, or the like. Note that, in the present disclosure, the horizontally-fixed storage bag 60) indicates the situation where the storage bag 600 is fixed to the sheet storage apparatus 1 with an opening 601 of the storage bag 600 facing sideways in an opening state as illustrated in FIG. 1. Further, in the present disclosure, facing sideways indicates the situation where the opening 601 of the storage bag 600 is oriented closer to horizontal rather than vertical. As an example of the present disclosure, the storage bag 600 is fixed so that the opening 601 is horizontally oriented in FIG. 1. Although descriptions in the following embodiments are based on the case where the storage bag 600 is fixed so that the opening 601 is horizontally oriented as in FIG. 1, the present disclosure is not limited to this and the opening of the storage bag only needs to be oriented closer to horizontal rather than vertical. FIG. 1 illustrates a cross section of the sheet storage apparatus 1 and the storage bag 600 on a plane including the vertical direction and the horizontal direction.

The descriptions in the following embodiments are based on the case where the storage bag 600 is fixed so that the opening 601 is almost horizontally oriented, and thus the up-down direction in the sheet storage apparatus 1 is almost the same as the vertical direction. The present disclosure, however, is not limited to this, and the up-down direction in the sheet storage apparatus may be different from the vertical direction when the opening 601 of the storage bag 600 is fixed so as not to be horizontally oriented, for example.

The moving section 11 moves along the storing direction. The movement of the moving section 11 along the storing direction allows the sheets 500 to be pushed and moved into the storage bag 600. Note that the storing direction is a direction in which the moving section 11 pushes and moves the sheets 500, that is, the direction from the outside to the inside of the opening 601 of the storage bag 600. In the example of FIG. 1, the storing direction corresponds to the right-left direction in the drawing. In the following description, the right side of FIG. 1, i.e., the back side of the storage bag 600 is referred to as the back side in the storing direction, and the left side of FIG. 1, i.e., the side close to the opening 601 of the storage bag 600 is referred to as the front side in the storing direction. An end portion of the moving section 11 on the front side in the storing direction is connected to a drive section, such as a motor, for moving the moving section 11 along the storing direction.

The moving section 11 is capable of pushing a predetermined amount of the sheets 500 into the storage bag 600 by its movement. After pushing a predetermined amount of the sheets 500 into the storage bag 600, the moving section 11 moves back to the front side from the opening 601 of the storage bag 600 in the storing direction. Then, new sheets 500 are accumulated between the moving section 11 and the opening 601, and the moving section 11 pushes the sheets

500 into the storage bag 600 again. By repeating such an operation several times, the sheets 500 are stored in the storage bag 600 until the storage bag 600 becomes full. Note that, instead of repeating the accumulation of the sheets 500 and the movement of the sheets 500 into the storage bag 600 by the moving section 11 several times, the moving section 11 may move a large amount of accumulated sheets 500 into the storage bag 600 all at once.

The first storage bag supporting section 12 comprises a first supporting surface 12S for supporting the bottom surface of the storage bag 600 that is horizontally fixed. The second storage bag supporting section 13 comprises a second supporting surface 13S for supporting the bottom surface of the storage bag 600 that is horizontally fixed. The first supporting surface 12S and the second supporting surface 13S are parallel to each other on different planes. The second supporting surface 13S is placed lower than the first supporting surface 12S. Thus, there is a step between the first supporting surface 12S and the second supporting surface 13S. Hereinafter, the step is referred to as a step section 14.

The first storage bag supporting section 12 and the second storage bag supporting section 13 may be formed in a single piece by a plate member bent at the step section 14. The first storage bag supporting section 12, the second storage bag supporting section 13, and the step section 14 may be formed separately from each other. In this case, the first storage bag supporting section 12 and the second storage bag supporting section 13 are connected to each other by a member composing the step section 14. Alternatively, the first storage bag supporting section 12 and the second storage bag supporting section 13 may be formed separately from each other.

Note that the shape of the storage bag 600 is not particularly limited, and it is formed to be suitable for the sheet storage apparatus 1 comprising the above-described configuration in the present disclosure, by way of example. Note also that the following description on the shape of the storage bag 600 is based on a situation that the opening 601 of the storage bag 600 faces sideways, as illustrated in FIG. 1.

In the example illustrated in FIG. 1, the height of the storage bag 600 in the up-down direction at the portion close to the opening 601 is different from that at the portion on the back side of the storage bag 600. To be more specific, the height at the portion on the back side is higher than the height at the portion close to the opening 601. By way of example, the height at the portion close to the opening 601 of the storage bag 600 is configured to fit the height of the sheets 500 to be stored when they are in the upright state. In addition, the height of the step section 14 may be configured to be approximately half the height of the sheets 500 to be stored when they are in the upright state, by way of example. The values of these heights are values set for storing as many sheets 500 as possible in the storage bag 600. Note that the sheet 500 in the upright state indicates the situation where the sheet 500 having a rectangular shape in the front view is placed upright on a predetermined flat surface, for example. In the following description, the storage bag 600 having such across section is referred to as a storage bag with expanded back. The storage bag with expanded back is an example of the first form of the storage bag in the present disclosure.

When the storage bag 600 having such a shape is horizontally attached to the sheet storage apparatus 1, the portion close to the opening 601 of the storage bag 600 is supported by the first storage bag supporting section 12, and the portion on the back side is supported by the second storage bag supporting section 13, as illustrated in FIG. 1.

Figure 2A:
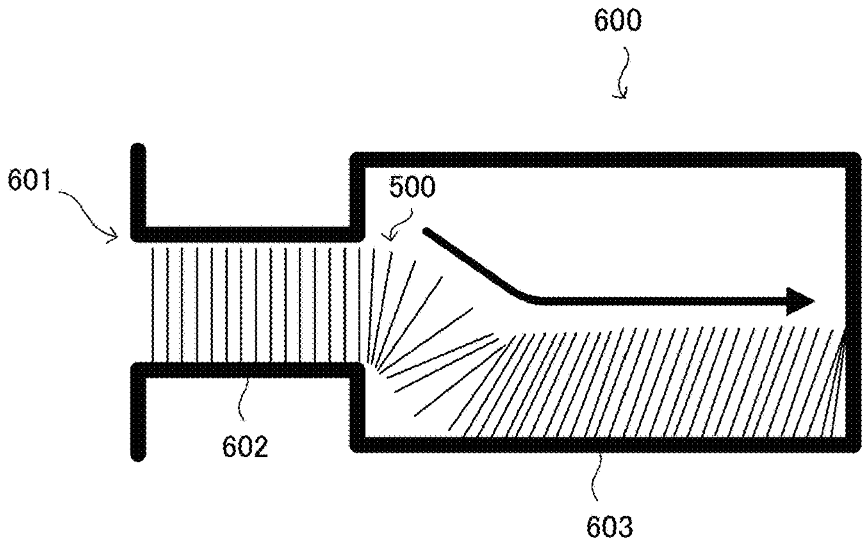
FIG. 2A is a diagram illustrating sheets being stored into a storage bag.
Figure 2B:
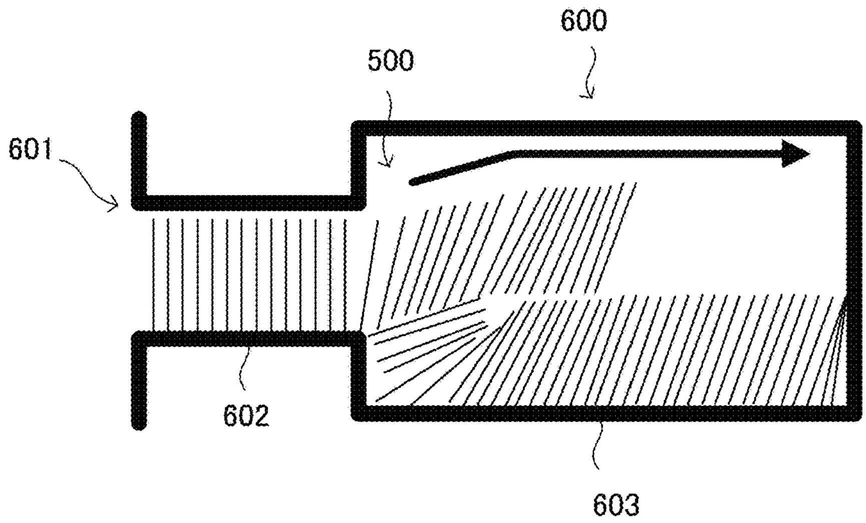
FIG. 2B is another diagram illustrating sheets being stored into a storage bag.
Figure 2C:
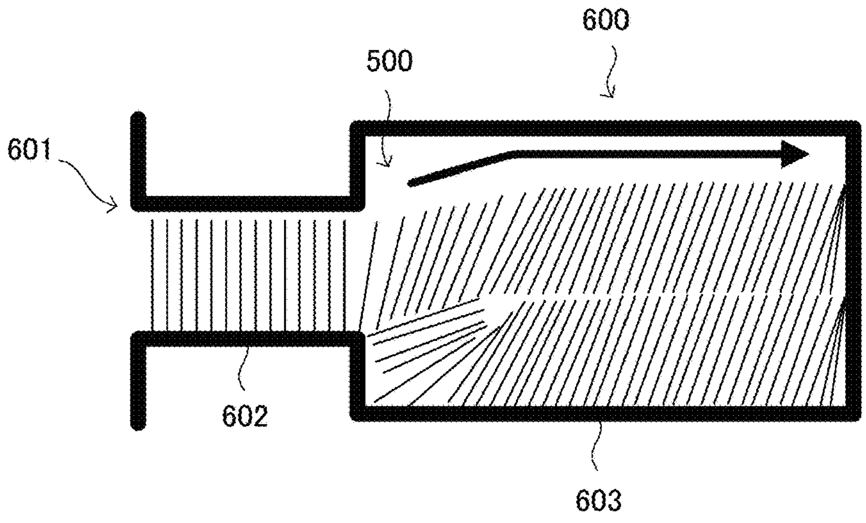
FIG. 2C is still another diagram illustrating sheets being stored into a storage bag.

Next, a description will be given of the sheets 500 being stored into the storage bag 600 fixed to the sheet storage apparatus 1. FIGS. 2A, 2B, and 2C are diagrams illustrating the sheets 500 being stored into the storage bag 600.

As illustrated in FIGS. 1 and 2A to 2C, the portion close to the opening 601 of the storage bag 600 horizontally fixed to the sheet storage apparatus 1 is referred to as a first portion 602, and the portion on the back side is referred to as a second portion 603. The first portion 602 is a portion supported by the first supporting surface 12S and the second portion 603 is a portion supported by the second supporting surface 13S. Since the second supporting surface 13S is positioned lower than the first supporting surface 12S, the second portion 603 is positioned lower than the first portion 602 in the storage bag 600 fixed to the sheet storage apparatus 1, and there is a step between the first portion 602 and the second portion 603.

In such a state, a plurality of sheets 500 are pushed toward inside the fixed storage bag 600 by the moving section 11. The plurality of sheets 500 being pushed toward inside the storage bag 600 by the moving section 11 support each other by the pushing force given by the moving section 11, and thus the sheets 500 stay upright on the first portion 602 supported by the first supporting surface 12S.

The sheets 500 on the first portion 602 are pushed by the moving section 11, and the sheet 500 at the farthest back in the storing direction reaches the step between the first portion 602 and the second portion 603 and falls down from the step. The sheets 500 fallen down from the step accumulate on the second portion 603. The sheets 500 fallen down from the step accumulate on the second portion 603 still in the upright state or in the slanting or fallen state. The states of the sheets 500 fallen down from the step vary depending on, for example, the strength of the pushing force by the moving section 11, the height of the step, coefficients of friction of the inner surface of the storage bag 600 and the lower end of the sheet 500, etc. In FIG. 1, the sheets 500 fallen down from the step are in the fallen state.

FIGS. 2A, 2B, and 2C illustrate a situation where the moving section 11 further pushes the sheets 500 toward inside the storage bag 600 (toward the back side in the storing direction) from the state illustrated in FIG. 1. FIG. 2A illustrates a state where the sheets 500 accumulated on the second portion 603 in FIG. 1 are pushed by other sheets 500 and reach the far back end of the storage bag 600 on the second portion 603. FIG. 2B illustrates a state where the sheets 500 are further pushed from the state illustrated in FIG. 2A and start moving on the upper side of the sheets 500 on the second portion 603. FIG. 2C illustrates a state where the storage bag 600 is filled with the sheets 500.

As illustrated in FIGS. 1 and 2A to 2C, the cross section of the storage bag 600 has more space on the back side in the storing direction than the side close to the opening 601, and thus space is secured for the sheets 500 to be newly stored to go through on the upper side of the sheets 500 accumulated on the second portion 603. When new sheets 500 are further pushed by the moving section 11, the new sheets 500 move on the upper side of the sheets 500 accumulated on the second portion 603 using the sheets 500 accumulated on the second portion 603 as a foundation, as illustrated in FIG. 2B.

Note that, in the sheet storage apparatus 1 of the present disclosure, the moving section 11 simply pushes the sheets 500 when storing the sheets 500 into the storage bag 600, and thus the sheets 500 do not always behave (e.g. move, position and/or orient) the same inside the storage bag 600.

In some cases, the sheet 500 is completely fallen when falling down from the step of the storage bag 600 and other sheets 500 are stacked on the completely fallen sheet 500, for example. In other cases, the sheets 500 reach the far back end in the slanting state. Additionally, when the sheets 500 move on the upper side of the sheets 500 on the second portion 603, the moving sheets 500 get caught and fall sometimes and reach the far back end without getting caught other times. Such differences in the behavior are made depending on how old the sheet 500 is, the size, the coefficient of friction of the lower end and upper end of the sheet 500, the coefficient of friction of the inner surface of the storage bag 600, a slight difference in the position of the sheet 500 accumulated before being stored in the storage bag 600, etc. The behaviors of the sheets 500 illustrated in FIGS. 1 and 2A to 2C are merely exemplary behaviors of the sheets 500 when being stored in the sheet storage apparatus 1 of the present disclosure.

Figure 3A:
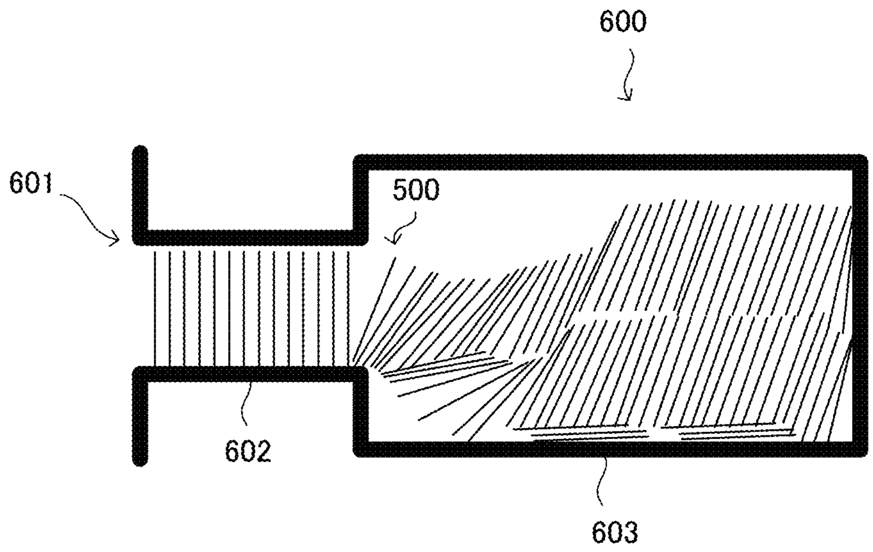
FIG. 3A is a diagram illustrating another example of sheets being stored.
Figure 3B:
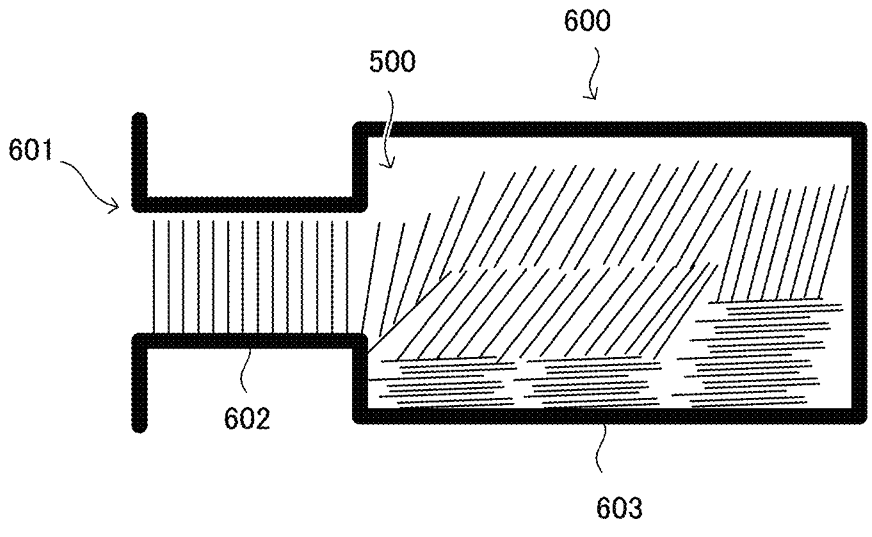
FIG. 3B is a diagram illustrating still another example of sheets being stored.

FIGS. 3A and 3B are diagrams illustrating other examples of the sheets 500 when being stored in the sheet storage apparatus 1 of the present disclosure. In FIG. 3A, some sheets 500 are stacked on the second portion 603 in the fallen state and other sheets 500 are stored on the stacked sheets 500. In FIG. 3B, more sheets 500 are stacked on the second portion 603.

As illustrated in FIGS. 1, 2A to 2C, 3A, and 3B, the sheet storage apparatus 1 of the present disclosure makes it possible to store as many sheets 500 as possible in the storage bag 600 no matter how the sheets 500 are stored inside the storage bag 600.

The description is back to the configuration of the sheet storage apparatus 1. In the sheet storage apparatus 1 according to Embodiment 1, the first storage bag supporting section 12 and the second storage bag supporting section 13 that support the bottom surface of the storage bag 600 are respectively configured to have supporting surfaces at different heights, as illustrated in FIG. 1. The second supporting surface 13S on the back side in the storing direction is placed lower than the first supporting surface 12S, and the step section 14 is provided between the first storage bag supporting section 12 and the second storage bag supporting section 13. With this configuration, when the sheet storage apparatus 1 is provided with the storage bag 600 the back portion of which has more height than the portion close to the opening 601, the first portion 602 close to the opening 601 can be held by the first supporting surface 12S of the first storage bag supporting section 12 and the second portion 603 close to the back side can be held by the second supporting surface 13S of the second storage bag supporting section 13.

The back portion of the storage bag 600 is formed to have more height. i.e., more capacity, than the portion close to the opening 601. This allows the back portion of the storage bag 600 to store the sheets 500 by stacking the sheets 500 in multiple layers in the height direction, as illustrated in FIGS. 2A to 2C, 3A, and 3B. This significantly increases the amount of the sheets 500 storable in the storage bag 600 compared to the case of storing the sheets 500 without stacking in the height direction.

Further, in the sheet storage apparatus 1 according to Embodiment 1, the sheets 500 are not necessarily organized when stored in the back portion of the storage bag 600, as illustrated in FIGS. 2A to 2C, 3A, and 3B, and the sheets 500 stored in the storage bag 600 can be in various states. Regardless of the states of the sheets 500, the sheet storage apparatus 1 according to Embodiment 1 can store the sheets 500 so as to be stacked in the height direction in the back portion of the storage bag 600. This makes it possible to store as many sheets 500 as possible in the storage bag 600.

Embodiment 2

Figure 4:
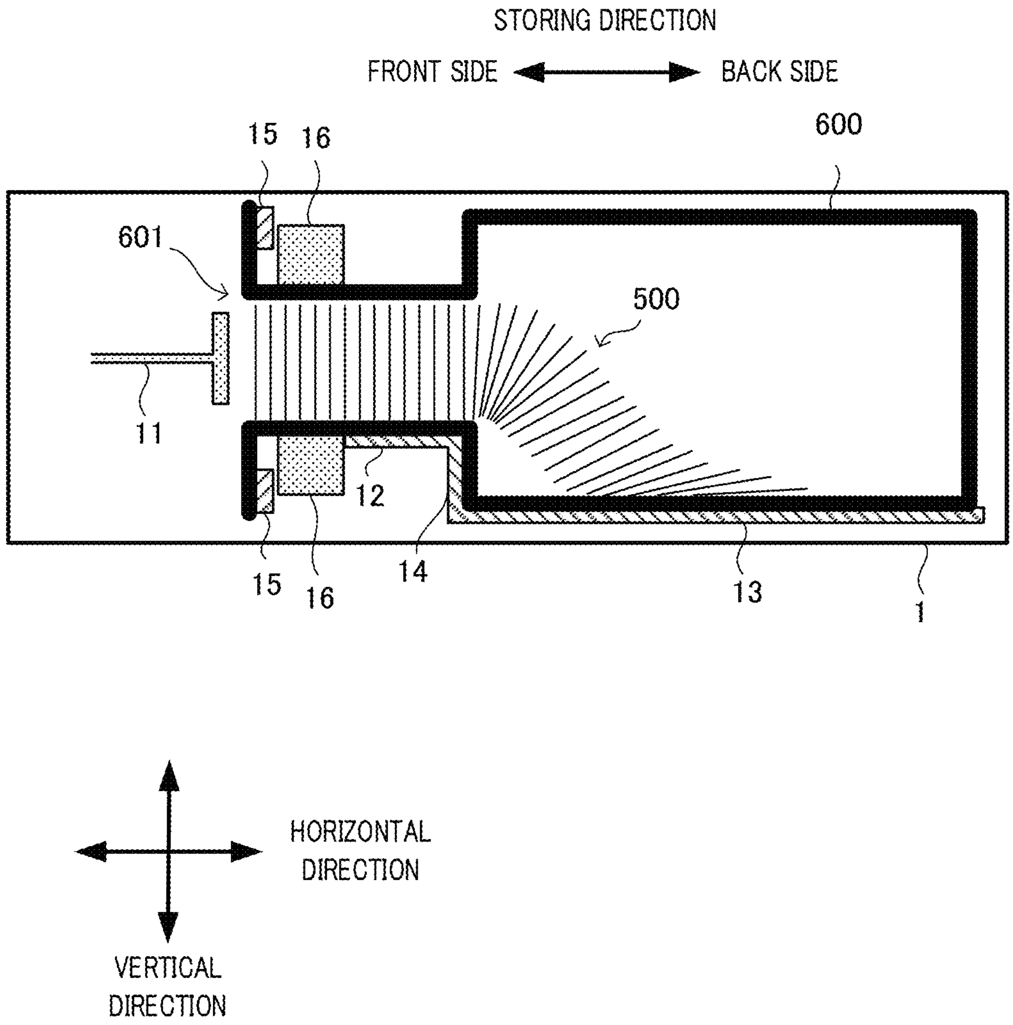
FIG. 4 is a diagram illustrating an exemplary configuration of the sheet storage apparatus according to Embodiment 2.

In Embodiment 2, the sheet storage apparatus 1 further comprises fixing sections 15 that fix the storage bag 600 and sealing sections 16 that seal the storage bag 600 at a part close to the opening 601. FIG. 4 is a diagram illustrating an exemplary configuration of the sheet storage apparatus 1 according to Embodiment 2.

The fixing sections 15 horizontally fix the storage bag 600. The fixing sections 15 are provided in a pair along the up-down direction. The method of fixing the storage bag 600 by the fixing sections 15 is not particularly limited. For example, the fixing sections 15 each comprise a pin and fix the storage bag 600 by threading the pin through a hole provided to the opening 601 of the storage bag 600. The positions of the fixing sections 15 in the storing direction are on the front side from a front end portion of the first storage bag supporting section 12.

The sealing sections 16 may be provided in a pair along the up-down direction, for example. A pair of the sealing sections 16 closes the storage bag 600 by pinching a part close to the opening 601 of the storage bag 600 from above and below and seals the closed part. Adoptable sealing methods of the sealing sections 16 include, for example, a method of welding by heat, a method of crimping by applying pressure from above and below, etc. The positions of the sealing sections 16 in the storing direction are on the back side from the fixing sections 15 and the front side from the step section 14.

As described above, in the sheet storage apparatus 1 according to Embodiment 2, the storage bag 600 can be sealed by the sealing sections 16. Since the sealing sections 16 are placed on the front side from the step section 14 in the storing direction, it is possible to seal the storage bag 600 around the opening 601 without involving folded or fallen banknotes Note that, in the example illustrated in FIG. 4, the sealing sections 16 are placed between the fixing sections 15 and the front end portion of the first storage bag supporting section 12 in the storing direction so that the first storage bag supporting section 12 does not prevent the sealing of the storage bag 600 by the sealing sections 16. The sealing sections 16 are, however, not necessarily provided between the fixing sections 15 and the first storage bag supporting section 12, and the first storage bag supporting section 12 may be placed extending from the position of the fixing section 15 to the step section 14 in the storing direction, as in FIG. 1 and the like. In this case, the lower sealing section of the pair of the sealing sections 16 is placed below the first storage bag supporting section 12, and a hole, for example, is formed on a part of the first storage bag supporting section 12 for the sealing section 16 to pass through. This allows the first storage bag supporting section 12 not to prevent the sealing by the sealing sections 16. Alternatively, the first storage bag supporting section 12 may be configured to be movable to a position that does not prevent the sealing of the storage bag 600 when the sealing is performed by the sealing sections 16.

Embodiment 3

Figure 5:
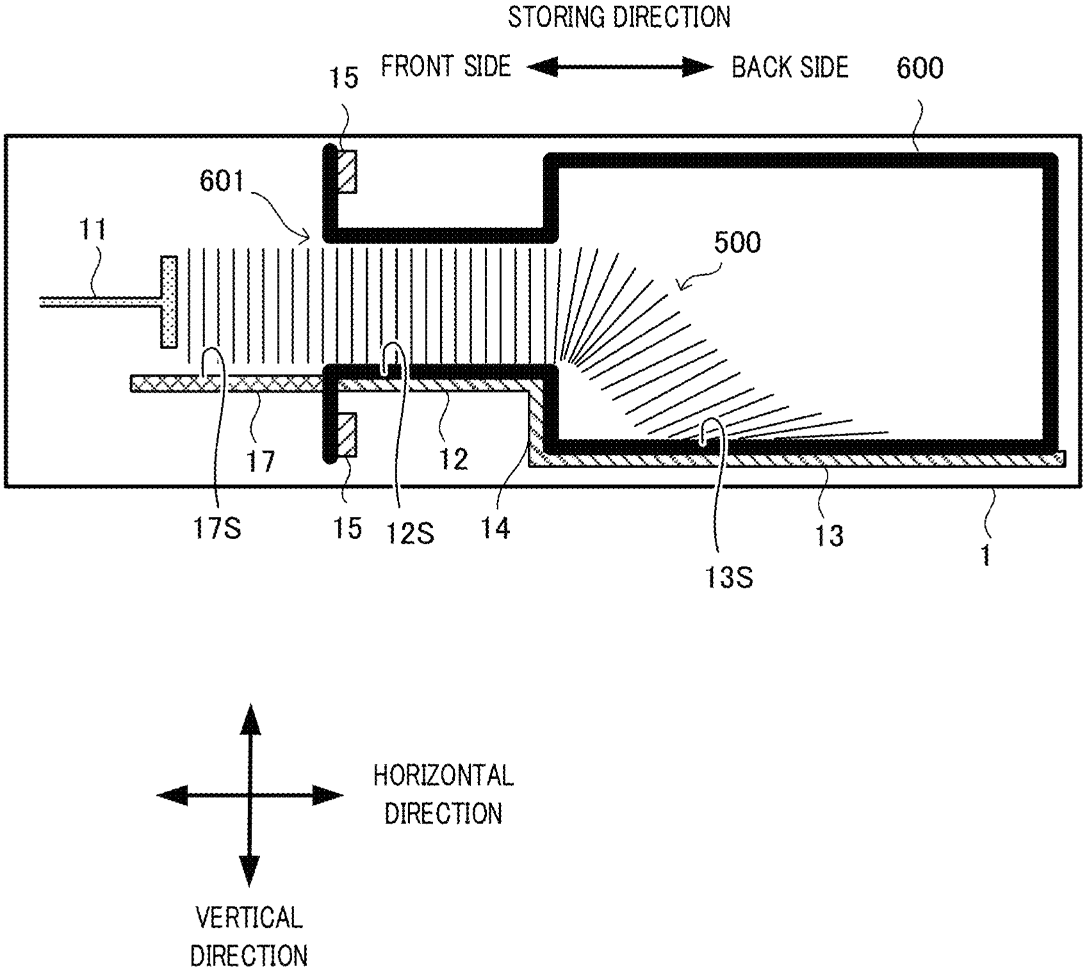
FIG. 5 is a diagram illustrating an exemplary configuration of the sheet storage apparatus according to Embodiment 3.

In Embodiment 3, the sheet storage apparatus 1 is provided with an accumulating section 17 on the front side from the first storage bag supporting section 12 in the storing direction. The accumulating section 17 is a section where the sheets 500 before being stored in the storage bag 600 are accumulated upright. FIG. 5 is a diagram illustrating an exemplary configuration of the sheet storage apparatus 1 according to Embodiment 3.

The accumulating section 17 comprises an accumulating surface 17S for accumulating the sheets 500 upright. As illustrated in FIG. 5, the accumulating surface 17S is placed on the same plane as the first supporting surface 12S of the first storage bag supporting section 12. Note that the term "same plane" in the present disclosure does not indicate only strictly the same plane but allows for a discrepancy of a few millimeters, for example. In FIG. 5, the thickness of the storage bag 600 is illustrated exaggeratedly; accordingly, the accumulating surface 17S and the inner surface of the storage bag 600 supported by the first supporting surface 12S seem to be on different planes. The storage bag 600, however, is actually very thin, and thus the accumulating surface 17S and the inner surface of the storage bag 600 supported by the first supporting surface 12S can be regarded as on substantially the same plane.

The sheets 500 are transported to the accumulating section 17 through a transport path, the detail of which will be described later, comprised by the sheet storage apparatus 1, for example. Then, the plurality of sheets 500 are accumulated upright on the accumulating surface 17S of the accumulating section 17 by an accumulating mechanism comprising a stacking wheel. Note that the accumulating mechanism of the accumulating section 17 may comprise a supporting section that supports the sheets 500 to prevent the upright sheets 500 accumulated on the accumulating surface 17S from falling. The moving section 11 moves the sheets 500 accumulated on the accumulating surface 17S of the accumulating section 17 along the accumulating surface 17S; accordingly, the sheets 500 are stored in the storage bag 600 remaining upright.

In addition, the accumulating section 17 is placed on the side closer to the first storage bag supporting section 12 than the farthest front position in the storing direction within the movable range of the moving section 11. In the storing direction, the back end of the accumulating section 17 makes close contact with the front end of the first storage bag supporting section 12 via the storage bag 600. This prevents the sheets 500 accumulated on the accumulating surface 17S of the accumulating section 17 from dropping between the accumulating section 17 and the first storage bag supporting section 12 when the sheets 500 are moved into the storage bag 600 by the moving section 11.

Embodiment 4

In Embodiment 4, the first storage bag supporting section 12, the second storage bag supporting section 13, and the step section 14 are configured to be removable from the sheet storage apparatus 1. The removal is performed by a user of the sheet storage apparatus 1, for example. The removal is performed by unfastening a screw fixed to a housing of the sheet storage apparatus 1, for example. Note that, for simplicity, the removal of the first storage bag supporting section 12, the second storage bag supporting section 13, and the step section 14 is simply referred to as the removal of the first storage bag supporting section 12 and the second storage bag supporting section 13, in the following description.

In Embodiment 4, a third storage bag supporting section 30 can be attached instead of the removed first storage bag supporting section 12 and second storage bag supporting section 13. In other words, the first storage bag supporting section 12 and the second storage bag supporting section 13 are configured to be exchangeable for the third storage bag supporting section 30.

Figure 6A:
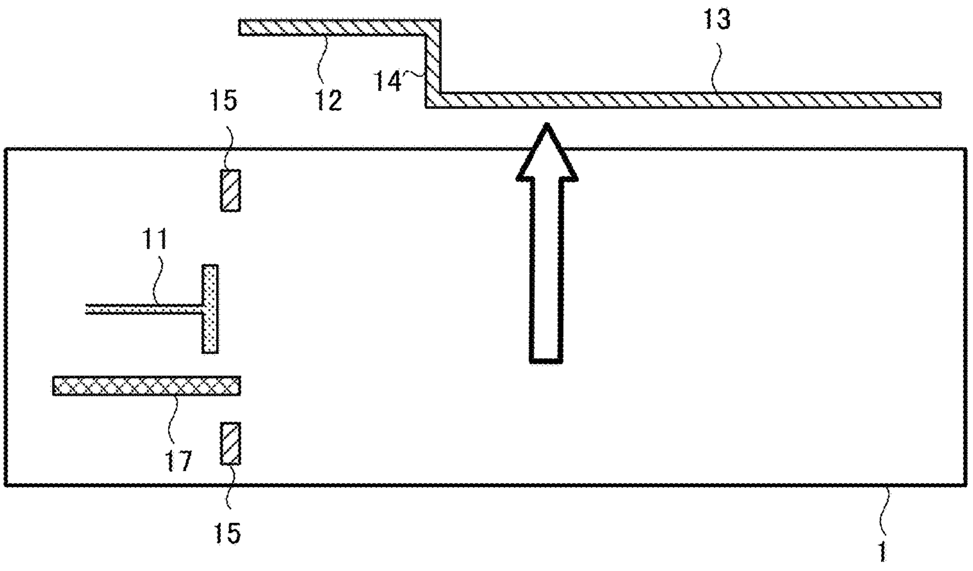
FIG. 6A is a diagram illustrating a first storage bag supporting section and a second storage bag supporting section being removed from the sheet storage apparatus.
Figure 6B:
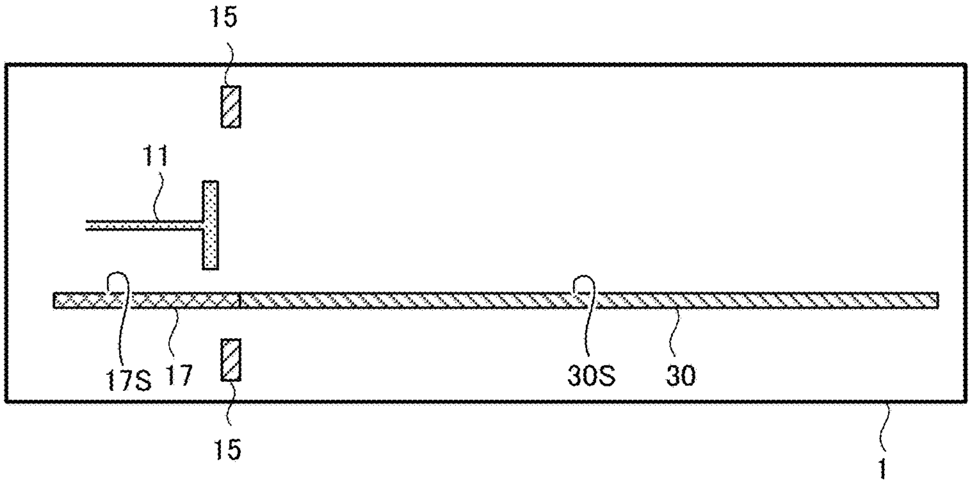
FIG. 6B is a diagram illustrating a third storage bag supporting section attached instead of the first storage bag supporting section and the second storage bag supporting section.
Figure 6C:
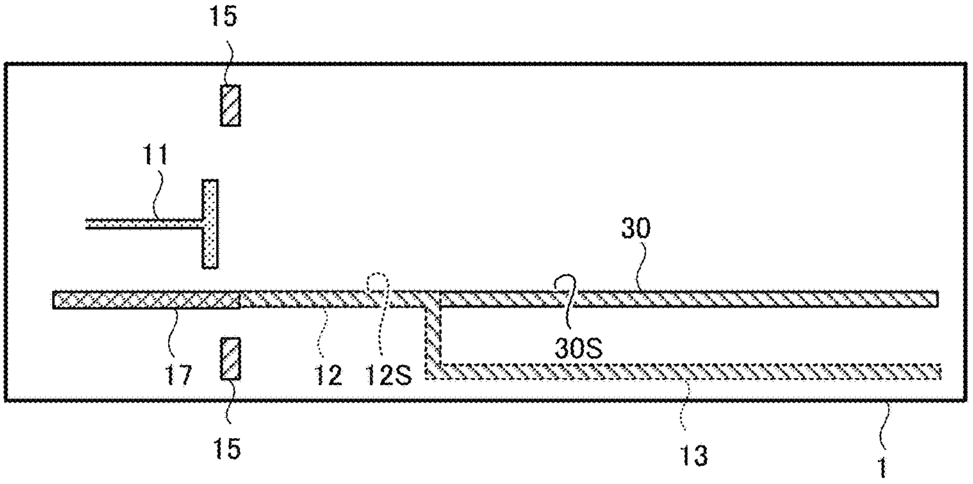
FIG. 6C is a diagram comparing a state where the first storage bag supporting section and the second storage bag supporting section are attached and a state where the third storage bag supporting section is attached.

FIGS. 6A to 6C illustrate states where the first storage bag supporting section 12 and the second storage bag supporting section 13 are removed from the sheet storage apparatus 1 and the third storage bag supporting section 30 is attached, in Embodiment 4. FIG. 6A is a diagram illustrating the first storage bag supporting section 12 and the second storage bag supporting section 13 being removed from the sheet storage apparatus 1. FIG. 6B is a diagram illustrating the third storage bag supporting section 30 attached instead of the first storage bag supporting section 12 and the second storage bag supporting section 13. Note that, although the first storage bag supporting section 12 and the second storage bag supporting section 13 are removed toward the upper side of the sheet storage apparatus 1 in the example illustrated in FIG. 6A, they may be removed in different directions in the present disclosure.

As illustrated in FIG. 6B, the third storage bag supporting section 30 is configured, when attached to the sheet storage apparatus 1, to have substantially the same length as the first storage bag supporting section 12 and the second storage bag supporting section 13 in the storing direction. In addition, the third storage bag supporting section 30 comprises a third supporting surface 30S that supports a storage bag 700. The third supporting surface 30 is a single plane that supports the entire bottom surface of the storage bag 700.

The third supporting surface 30S when the third storage bag supporting section 30 is attached to the sheet storage apparatus 1 is on the same plane as the first supporting surface 12S when the first storage bag supporting section 12 and the second storage bag supporting section 13 are attached to the sheet storage apparatus 1. That is, the third supporting surface 30S is a plane obtained by extending the first supporting surface 12S toward the back side in the storing direction, as illustrated in FIG. 6C. FIG. 6C is a diagram comparing a state where the first storage bag supporting section 12 and the second storage bag supporting section 13 are attached to the sheet storage apparatus 1 and a state where the third storage bag supporting section 30 is attached to the sheet storage apparatus 1. In FIG. 6C, the first storage bag supporting section 12 and the second storage bag supporting section 13 are illustrated in broken lines and the third storage bag supporting section 30 is illustrated in solid lines.

Figure 7A:
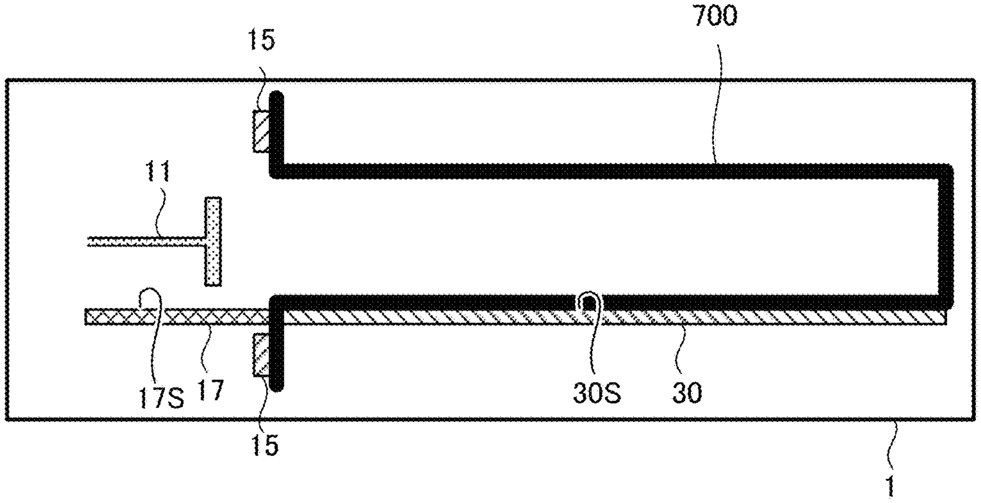
FIG. 7A is a diagram illustrating an exemplary cross section of a storage bag used when the third storage bag supporting section is attached.

In the state where the third storage bag supporting section 30 is attached to the sheet storage apparatus 1, the storage bag 700 that is different in shape from the storage bag 600 described in Embodiments 1 to 3 may be attached as a storage bag for storing the sheets 500. FIG. 7A is a diagram illustrating an exemplary cross section of the storage bag 700 used in the state where the third storage bag supporting section 30 is attached.

The storage bag 700 has a cross section different from the storage bag 600, which is a storage bag with expanded back and has different heights on the side close to the opening 601 and the back side in the storing direction. The side close to an opening 701 and the back side have substantially the same height in the storage bag 700. In the following description, the storage bag 700 having such a cross section is referred to as a straight storage bag. The straight storage bag is an example of the second form of the storage bag in the present disclosure. The bottom surface of the storage bag 700 having such a cross section is along the third supporting surface 30S of the third storage bag supporting section 30 and entirely supported by the third supporting surface 30S in the length direction.

Figure 7B:
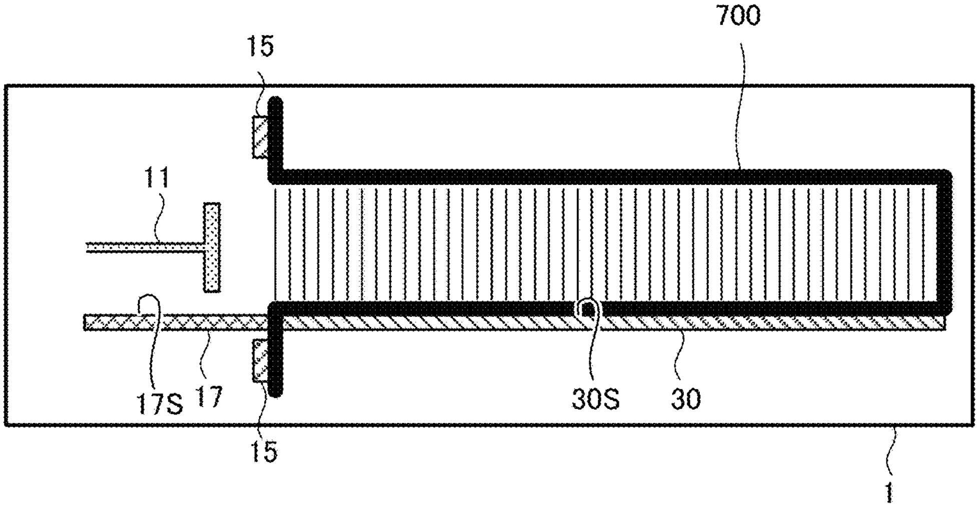
FIG. 7B is a diagram illustrating sheets stored in the storage bag.

By way of example, the height at the portion close to the opening 701 of the storage bag 700 is configured to fit the height of the sheets 500 to be stored when they are in the upright state. This allows the sheets 500 to be organized remaining upright when being stored in the storage bag 700, in the sheet storage apparatus 1. FIG. 7B is a diagram illustrating the sheets 500 stored in the storage bag 700.

Since the sheet storage apparatus 1 according to the present disclosure aims to store as many sheets as possible in a storage bag, descriptions have been in Embodiments 1 to 3 about the configuration in which the sheets 500 can be stacked in the height direction when stored using the storage bag 600, which is a storage bag with expanded back. In the sheet storage apparatus 1 according to Embodiment 4, the first storage bag supporting section 12 and the second storage bag supporting section 13 that support the storage bag 600, which is a storage bag with expanded back, are exchangeable for the third storage bag supporting section 30 that supports the storage bag 700, which is a straight storage bag.

When the storage bag 700 is used, it is difficult to store the sheets 500 stacked on top of each other since it is a straight storage bag. It is possible, however, to store the sheets 500 upright and organized in the storage bag 700 since the height of the fixed storage bag 700 is configured to fit the height of the upright sheets 500. This prevents the sheets 500 stored in the storage bag 700 from being folded, wrinkled, etc., thereby storing the sheets 500 in high quality in the storage bag 700.

As described above, in the sheet storage apparatus 1 according to Embodiment 4, the first storage bag supporting section 12 and the second storage bag supporting section 13 are configured to be exchangeable for the third storage bag supporting section 30. This makes it possible to support both a case of storing a large amount of the sheets 500 and a case of storing the sheets 500 in high quality, depending on the preference of a user of the sheet storage apparatus 1.

Embodiment 5

Figure 8:
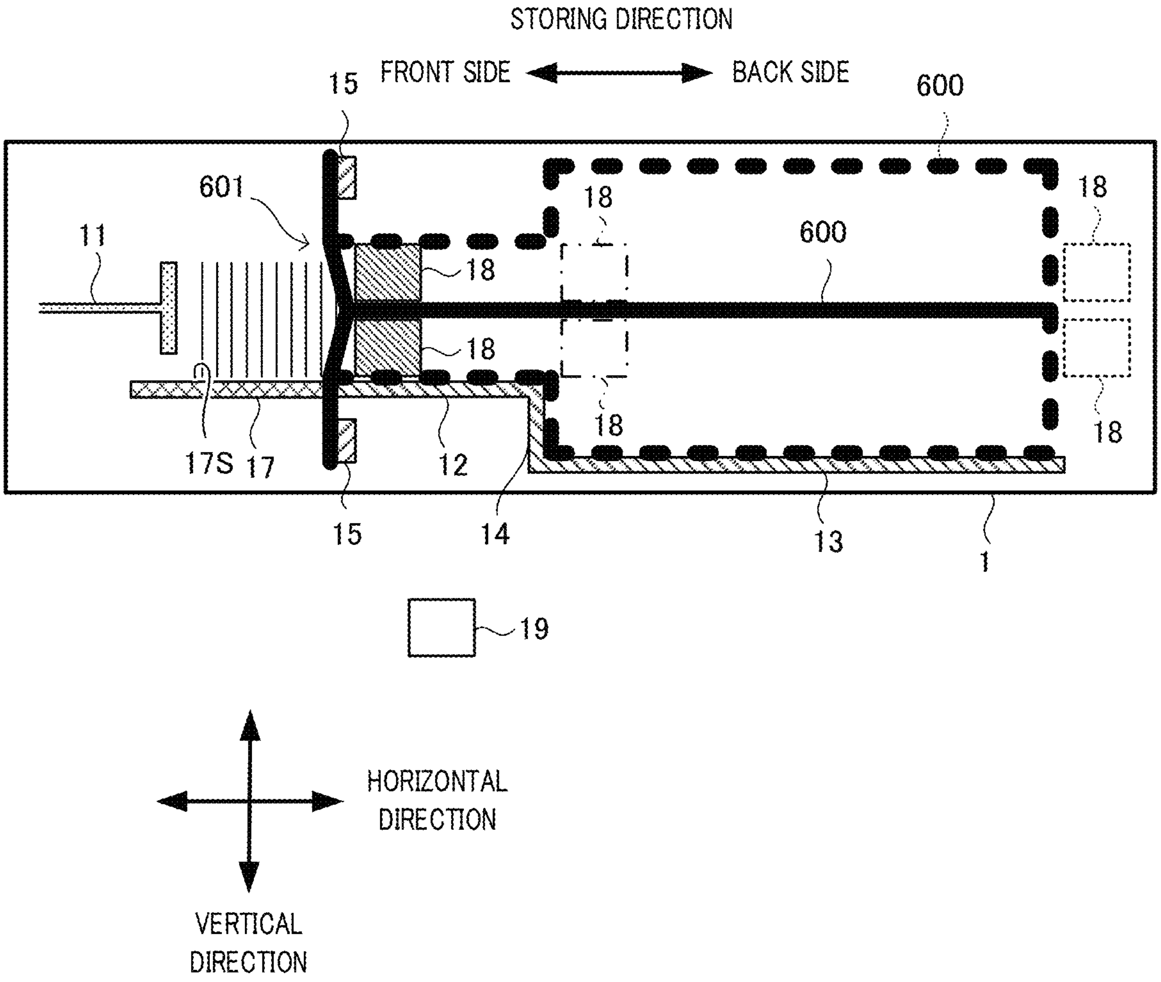
FIG. 8 is a diagram illustrating an exemplary configuration of the sheet storage apparatus according to Embodiment 5.

In Embodiment 5, the sheet storage apparatus 1 further comprises sheet supporting sections 18 that maintain the sheets 500 upright and a control section 19 that controls an operation of the sheet supporting sections 18. FIG. 8 is a diagram illustrating an exemplary configuration of the sheet storage apparatus 1 according to Embodiment 5. Note that the sheet supporting sections 18 are sometimes referred to as a stage or the like.

The sheet supporting sections 18 are movable along the storing direction. The movement of the sheet supporting sections 18 is controlled by the control section 19. The control section 19 is a processor such as a central processing unit (CPU), for example, and may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. More specifically, the control section 19 controls the movement of the sheet supporting sections 18 by controlling a drive section, such as a motor, that provides driving force to move the sheet supporting sections 18. Note that the control section 19 may control the movement of the moving section 11 in addition to the movement of the sheet supporting sections 18.

The sheet supporting sections 18 are provided in a pair in the up-down direction, and there is a predetermined gap between the pair of the sheet supporting sections 18. When an empty storage bag 600 is attached to the sheet storage apparatus 1, the sheet supporting sections 18 move to a position that does not prevent the attachment of the storage bag 600, for example, a farthest back position in the storing direction within the movable range of the sheet supporting sections 18, which is the position illustrated in broken lines in FIG. 8. Then, at the time of attaching the empty storage bag 600 to the sheet storage apparatus 1 by a user of the sheet storage apparatus 1, for example, the empty storage bag 600 is folded and put through the gap between the pair of the sheet supporting sections 18 by the user. Maintaining this state, the sheet supporting sections 18 move to the farthest front positions in the storing direction within the movable range, which is the positions illustrated in solid lines in FIG. 8. FIG. 8 illustrates the empty storage bag 600 folded and put through the gap between the pair of the sheet supporting sections 18 and also illustrates the unfolded storage bag 600 in broken lines.

The height of the pair of the sheet supporting sections 18 in the up-down direction is configured to be almost the same as the height around the opening 601 of the storage bag 600. This allows the sheet supporting sections 18 to move along the storing direction without interfering the first storage bag supporting section 12, the second storage bag supporting section 13, the step section 14, and the like. The farthest front positions of the sheet supporting sections 18 in the storing direction are, for example, positions where the surfaces of the sheet supporting sections 18 on the front side are respectively close to the surfaces of the fixing sections 15 on the back side, which is the positions illustrated in solid lines in FIG. 8. This allows the sheet supporting sections 18 to support the sheets 500 when the sheets 500 start to be stored into the storage bag 600, thereby maintaining the sheets 500 upright.

When the sheets 500 accumulated on the accumulating surface 17S of the accumulating section 17 are moved by the moving section 11, the control section 19 moves the sheet supporting sections 18 based on the amount of the sheets 500 stored in the storage bag 600 (hereinafter, referred to as a storage amount). To be more specific, control section 19 moves the sheet supporting sections 18 while maintaining the state where the surfaces of the sheet supporting sections 18 on the front side in the storing direction support the sheet 500 at the farthest back and not preventing the movement of the sheets 500. This allows the sheets 500 to remain upright by the sheet supporting sections 18 while the sheets 500 are moved by the moving section 11.

When the sheet 500 at the farthest back reaches the step section 14 between the first storage bag supporting section 12 and the second storage bag supporting section 13, the sheets 500 fall from the step from the sheet 500 at the farthest back. The sheet supporting sections 18 cannot reach, in the height direction, the sheets 500 that are fallen from the step section 14 and accumulated on the second portion 603 of the storage bag 600 and cannot support the sheets 500 fallen from the step section 14 accordingly. Thus, the sheet supporting sections 18 are considered to complete the role of supporting the sheets 500 when the sheet 500 at the farthest back reaches the far back end of the first supporting surface 12S.

When the sheet supporting sections 18 reach the position on the back side of the step section 14 in the storing direction, which is the position illustrated in dot and dashed lines in FIG. 8, the control section 19 moves the sheet supporting sections 18 to the position that does not prevent the movement of the sheets 500 by the moving section 11, regardless of the storage amount. The position that does not prevent the movement of the sheets 500 by the moving section 11 is, for example, the farthest back position in the storing direction within the movable range of the sheet supporting sections 18, which is the position illustrated in broken lines in FIG. 8. After that, the sheet supporting sections 18 stands by at this position until the completion of storage of the sheets 500 in the storage bag 600. This makes it possible to avoid a situation where the sheet supporting sections 18 prevent the movement of the sheets 500.

Embodiment 6

In Embodiment 6, the sheet storage apparatus 1 is configured so that the first storage bag supporting section 12 and the second storage bag supporting section 13 are configured to be exchangeable for the third storage bag supporting section 30 as in Embodiment 4, and either the storage bag 600, which is a storage bag with expanded back, or the storage bag 700, which is a straight storage back, can be used. Further, in Embodiment 6, the sheet storage apparatus 1 comprises the sheet supporting sections 18 and the control section 19 as in Embodiment 5. In Embodiment 6, the control section 19 selectively performs the movement control for the sheet supporting sections 18 among different patterns of the movement control between the case of using the storage bag 600, which is a storage bag with expanded back, and the case of using the storage bag 700, which is a straight storage back.

In a case where the first storage bag supporting section 12 and the second storage bag supporting section 13 are attached to the sheet storage apparatus 1 and the storage bag 600, which is a storage bag with expanded back, is used, the control section 19 performs the same control as in the description in Embodiment 5. That is, when the sheets 500 accumulated on the accumulating surface 17S of the accumulating section 17 are moved by the moving section 11, the control section 19 moves the sheet supporting sections 18 while maintaining the state where the surfaces of the sheet supporting sections 18 on the front side support the sheet 500 at the farthest back until the sheet supporting sections 18 reach the back side of the step section 14.

When the sheet supporting sections 18 reach the back side of the step section 14, the control section 19 moves the sheet supporting sections 18 to the farthest back position in the storing direction within the movable range. In the following, the control for the sheet supporting sections 18 by the control section 19 in the case of using the storage bag 600, which is a storage bag with expanded back, is referred to as first movement control.

Meanwhile, in a case where the first storage bag supporting section 12 and the second storage bag supporting section 13 are exchanged for the third storage bag supporting section 30 in the sheet storage apparatus 1 and the storage bag 700, which is a straight storage back, is used, the control section 19 performs the following second movement control.

In the second movement control, when the sheets 500 accumulated on the accumulating surface 17S of the accumulating section 17 are moved by the moving section 11, the control section 19 moves the sheet supporting sections 18 while maintaining the state where the surfaces of the sheet supporting sections 18 on the front side support the sheet 500 at the farthest back until the sheet supporting sections 18 reach the far back end of the storage bag 700. This makes it possible to store the sheets 500 upright and organized in the storage bag 700.

The control section 19 determines which of the first movement control and the second movement control is to be performed, i.e., which of the storage bag 600 and the storage bag 700 is to be used, based on an operation by a user of the sheet storage apparatus 1, for example. To be more specific, the inside or outside of the housing of the sheet storage apparatus 1 is provided with an operation switch for selecting either the first movement control or the second movement control, and the control section 19 performs the movement control selected by the operation switch. Examples of the operation switch are a toggle switch, a dual in-line package (DIP) switch, etc.

Alternatively, the control section 19 may determine whether the first storage bag supporting section 12 and the second storage bag supporting section 13 are attached to the sheet storage apparatus 1 or the third storage bag supporting section 30 is attached to the sheet storage apparatus 1, based on an output value from a detecting section such as a sensor. To be more specific, the control section 19 detects, for example, the presence or absence of the step section 14 by a light sensor or the like. When the step section 14 is detected, the control section 19 determines that the first storage bag supporting section 12 and the second storage bag supporting section 13 are attached to the sheet storage apparatus 1, and when no step section 14 is detected, the control section 19 determines that the third storage bag supporting section 30 is attached.

Further, the control section 19 may determine whether the storage bag fixed to the sheet storage apparatus 1 is a storage bag with expanded back or a straight storage bag, based on an output value from a detecting section such as a sensor. By way of example, the outer surface of the storage bag is provided with a mark, such as a two-dimensional code, indicating the type of the storage bag, and the control section 19 determines whether a storage bag with expanded back is fixed or a straight storage bag is fixed depending on which is indicated by the mark read by an infrared sensor or the like.

The selection of the movement control by an operation switch and the determination based on an output value of a sensor may be combined. The control section 19 may provide a notification to a user when the movement control indicated by the selection by an operation switch and the movement control from the determination based on an output value of a sensor contradict each other. By way of example, an alarm sound may be triggered or an alert may be displayed on the display of the sheet storage apparatus 1 when the first movement control, which is for the case of using the storage bag 600, is selected by an operation switch whereas it is determined based on an output value of a sensor that the third storage bag supporting section 30 is attached (the storage bag 700, which is a straight storage back, is fixed). This encourages the user to take action such as properly switching the operation switch and attaching a storage bag of a preferred type.

Embodiment 7

Figure 9:
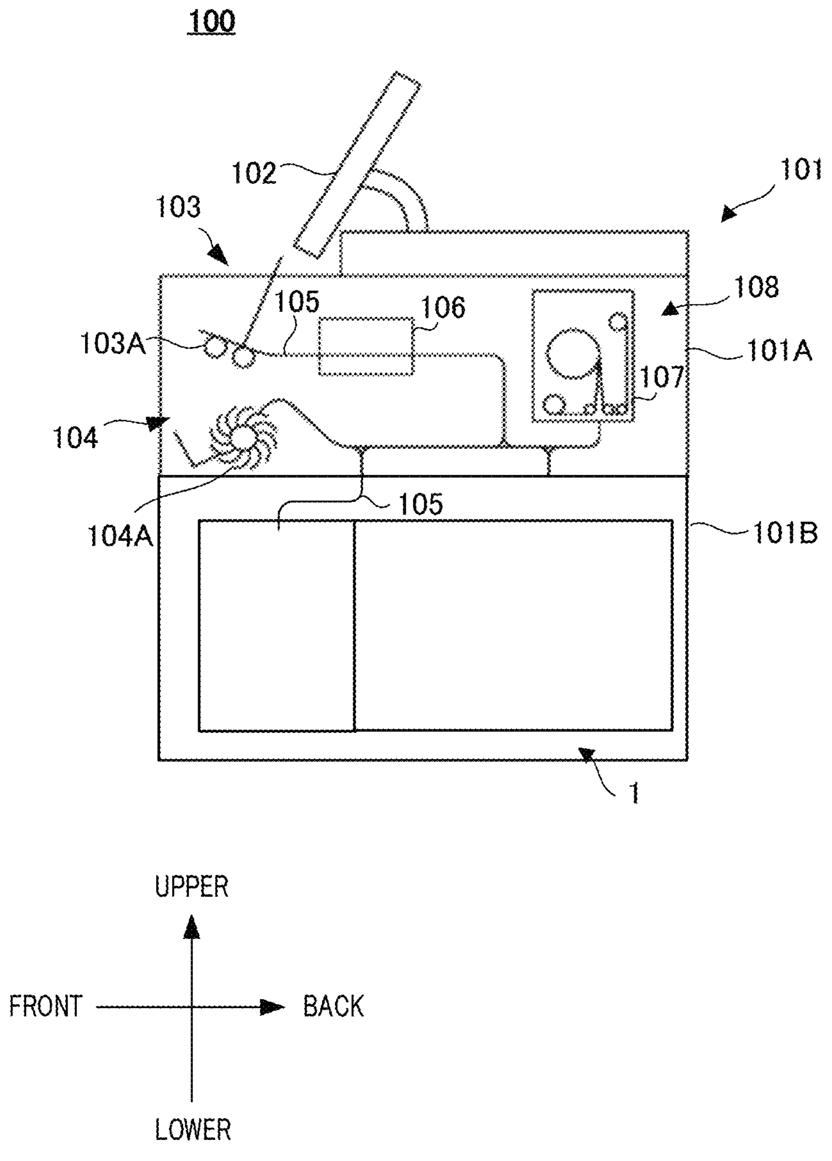
FIG. 9 is a diagram illustrating an exemplary configuration of a sheet handling apparatus comprising the sheet storage apparatus.

In Embodiment 7, a description will be given of a sheet handling apparatus 100 comprising the sheet storage apparatus 1 according to the embodiments described above. FIG. 9 is a diagram illustrating an exemplary configuration of the sheet handling apparatus 100 comprising the sheet storage apparatus 1.

The sheet handling apparatus 100 is an apparatus comprising a handling section that performs various processes, such as a deposit process and withdrawal process of sheets, by controlling the mechanisms in the apparatus. In the following description, aside where a receiving section 103, which will be described later, of the sheet handling apparatus 100 is placed is defined as front, and the opposite side is defined as back. A horizontal direction orthogonal to the front-back direction is defined as the right-left direction.

As illustrated in FIG. 9, the sheet handling apparatus 100 comprises a housing 101 having substantially a rectangular parallelepiped shape. An upper unit 101A and a lower unit 101B are accommodated inside the housing 101.

The upper unit 101A comprises a handling section 108 composed of an operation unit 102, the receiving section 103, an outlet section 104, a transport unit 105, a recognition unit 106, and a storage feeding unit 107.

The operation unit 102 is provided above the housing 101. The operation unit 102 receives an operation by a user of the sheet handling apparatus 100. The sheet handling apparatus 100 performs various processes in accordance with the operation of the user on the operation unit 102. The operation unit 102 may be, for example, a touchscreen laminated on a display, such as a liquid crystal display. In this case, the display may show a screen allowing a user to select a process to be performed by the sheet handling apparatus 100, a screen indicating the amount (the number, the total sum, etc.) of the sheets 500 stored in the sheet handling apparatus 100, or the like.

The receiving section 103 is provided at the front upper portion of the housing 101. The receiving section 103 comprises a receiving hopper or the like for inserting banknotes from the outside to inside of the housing 101. The outlet section 104 is provided below the receiving section 103 to deliver banknotes from the inside to outside of the housing 101.

The receiving section 103 receives a sheet group consisting of one or more sheets set by a user. The receiving section 103 comprises a feeding mechanism 103A for feeding sheets of a sheet group one by one to the inside of the housing 101. The sheets fed one by one from the feeding mechanism 103A are transported one by one by the transport unit 105.

The recognition unit 106 is provided on a transport path that composes the transport unit 105. The recognition unit 106 recognizes the kind, denomination, authenticity, face/back, fitness, new/old, transport condition, etc. of each sheet transported by the transport unit 105.

The storage feeding unit 107 (temporary storage unit) is provided downstream of the recognition unit 106 on the transport unit 105. The storage feeding unit 107 temporarily stores sheets transported from the transport unit 105 and feeds the stored sheets one by one to the transport unit 105. This allows the banknotes stored in the storage feeding unit 107 to be transported from the storage feeding unit 107 to the sheet storage apparatus 1 provided in the lower unit 101B. Note that the storage feeding unit 107 is composed of, for example, a tape reel feeding device.

The outlet section 104 is connected to the transport unit 105. In the withdrawal process or the like of the sheet handling apparatus 100, the necessary amount of sheets is temporarily stacked in the outlet section 104 by the transport unit 105. The outlet section 104 allows access from outside the housing 101, and a user can take out the sheets stacked in the outlet section 104 from the front of the housing 101.

A stacking wheel 104A is provided at a point connecting the outlet section 104 and the transport unit 105. With the rotation of the stacking wheel 104A, sheets held between the vanes of the stacking wheel 104A are stacked in the outlet section 104.

The handling unit 108 comprising the above-described components performs various processes, such as the deposit process and the withdrawal process, on sheets received from the receiving section 103. The deposit process is a process to store received sheets in the storage feeding unit 107 or the sheet storage apparatus 1. The withdrawal process is a process to withdraw sheets from the storage feeding unit 107 to the outlet section 104.

The above-described sheet storage apparatus 1 is provided in the lower unit 101B. The transport path of the transport unit 105 is connected to the accumulating section 17 described in Embodiment 3, etc., and the sheets transported by the transport unit 105 are accumulated on the accumulating surface 17S of the accumulating section 17.

In the example illustrated in FIG. 9, the storage bag 600 is attached so that the entrance faces the front side of the sheet handling apparatus 100; however, the present disclosure is not limited to this. For example, the entrance of the storage bag 600 may face the left side, right side, back side of the sheet handling apparatus 100, or in another direction perpendicular to the up-down direction.

VARIATIONS

The present disclosure is not limited to the descriptions in the above embodiments and includes variations. Exemplary variations will be described in the following.

Variation 1

In Embodiment 1 and the like, the sheet storage apparatus 1 may comprise a lid member that covers the upper side of the storage bag 600 when the storage bag 600 is fixed. When a large amount of sheets 500 is stored in the storage bag 600, the sheets 500 and the storage bag 600 are sometimes raised to the upper side due to the pushing force of the moving section 11. In such a case, the lid member prevents a part of the storage bag 600 from sticking out of the sheet storage apparatus 1.

Variation 2

In Embodiment 4 and the like, a description has been given of the configuration in which the first storage bag supporting section 12 and the second storage bag supporting section 13 are removed and exchanged for the third storage bag supporting section 30. As a variation, the sheet storage apparatus 1 may comprise a mechanism that moves the second storage bag supporting section 13 vertically as needed. The mechanism allows the second storage bag supporting section 13 to move between a first position lower than the first storage bag supporting section 12 and a second position at the same height as the first storage bag supporting section 12.

In this case, for example, the back end of the first storage bag supporting section 12 and the upper end of the step section 14 are connected by a pivoting member such as a hinge, and the lower end of the step section 14 and the front end of the second storage bag supporting section 13 are also connected by a pivoting member. In addition, a drive section such as a motor is placed below the second storage bag supporting section 13 and applies power to move the second storage bag supporting section 13 vertically as needed. With this configuration, when the power to move the second storage bag supporting section 13 to the upper side is applied, pivoting is caused at the points connected by the hinges and the first storage bag supporting section 12, the step section 14, and the second storage bag supporting section 13 are positioned on the same plane.

Such a configuration eliminates the need for causing a user to remove the first storage bag supporting section 12 and the second storage bag supporting section 13 and attach the third storage bag supporting section 30, thereby reducing labor of the user. Note that the vertical movement of the second storage bag supporting section 13 may be performed based on an operation of a user, for example. Alternatively, the vertical movement of the second storage bag supporting section 13 may be automatically performed based on the determination from an output value of a sensor or the like. The determination includes which of the first storage bag supporting section 12, the second storage bag supporting section 13, and the third storage bag supporting section 30 is attached, and which of a storage bag with expanded back and a straight storage bag is fixed.

Variation 3

In Embodiment 6, a description has been given of the configuration in which the first storage bag supporting section 12 and the second storage bag supporting section 13 are attached to the sheet storage apparatus 1, and when the storage bag 600 is used, the control section 19 controls the sheet supporting sections 18 so as to support the sheet 500 at the farthest back until the sheet supporting sections 18 reach the back side of the step section 14.

However, in the case where the first storage bag supporting section 12 and the second storage bag supporting section 13 are attached to the sheet storage apparatus 1 and the storage bag 600 is used, the sheet supporting sections 18 may be controlled to move to the farthest back position within the movable range before the sheets 500 accumulated on the accumulating surface 17S of the accumulating section 17 start to be moved by the moving section 11.

Adopting such control makes it possible to avoid a situation where the sheet supporting sections 18 prevent the movement of the sheets 500 when the first storage bag supporting section 12 and the second storage bag supporting section 13 are attached to the sheet storage apparatus 1.

Variation 4

In Embodiments 3 to 6, descriptions have been given of the configuration in which the back end of the accumulating section 17 in the storing direction makes close contact with the front end of the first storage bag supporting section 12 via the storage bag 600; however, the sealing sections 16 described in Embodiment 2 may be placed between the accumulating section 17 and the front end of the first storage bag supporting section 12. In this case, a guiding plate that guides the movement of the sheets 500 in the storing direction may be provided at a position corresponding to the sealing sections 16 between the accumulating section 17 and the first storage bag supporting section 12 in the storing direction. This guiding plate may be configured to be movable to the position that does not prevent the sealing of the storage bag 600 when the sealing is performed by the sealing sections 16.

The invention claimed is:

1. A sheet storage apparatus, comprising:

a moving section that moves a sheet to a back side, in a storing direction, of a storage bag fixed so that the storing direction is horizontal or closer to horizontal than to vertical;

a first storage bag support that supports a bottom surface of the storage bag;

a second storage bag support that is positioned on the back side from the first storage bag support in the storing direction and supports the bottom surface of the storage bag at a position lower than the first storage bag support;

a sheet support that supports the sheet to be stored in the storage bag so that the sheet is in an upright state; and a control circuit that controls movement of the sheet support to a farthest back position within a movable range of the sheet support before the sheet is stored in the storage bag.

2. The sheet storage apparatus according to claim 1, further comprising a step between the first storage bag support and the second storage bag support.

3. The sheet storage apparatus according to claim 2, wherein the first storage bag support, the second storage bag support, and the step integrally form a single support.

4. The sheet storage apparatus according to claim 2, further comprising a sealing section that is placed on a front side from the step section in the storing direction and seals the storage bag.

5. The sheet storage apparatus according to claim 1, wherein the control circuit controls the movement of the sheet support based on a storage amount of the storage bag.

6. The sheet storage apparatus according to claim 5, wherein the control circuit controls movement of the sheet support to the farthest back position within the movable range of the sheet support when the sheet support reaches a predetermined position with respect to the first storage bag support in the storing direction.

7. A sheet storage apparatus, comprising:

a moving section that moves a sheet to a back side, in a storing direction, of a storage bag fixed so that the storing direction is horizontal or closer to horizontal than to vertical;

a first storage bag support that supports a bottom surface of the storage bag; and a second storage bag support that is positioned on the back side from the first storage bag support in the storing direction and supports the bottom surface of the storage bag at a position lower than the first storage bag support;

a sheet support that supports the sheet to be stored in the storage bag so that the sheet is in an upright state; and a control circuit that selectively performs first movement control and second movement control, the first movement control being control for moving the sheet support in accordance with the storage amount of the sheet in the storage bag, the second movement control being control for moving the sheet support to a farthest back position within a movable range of the sheet support before the sheet is stored in the storage bag.

8. The sheet storage apparatus according to claim 7, further comprising:

an accumulating surface for accumulating the sheet before stored in the storage bag in the upright state, wherein the accumulating surface on a same plane as a first supporting surface of the first storage bag support and on a front side from the first supporting surface in the storing direction, and the first supporting surface supporting the bottom surface of the storage bag.

9. The sheet storage apparatus according to claim 8, wherein the second storage bag support is movable to a position where a second supporting surface of the second bag support is on a same plane as the first supporting surface, the second supporting surface supporting the bottom surface of the storage bag.

10. The sheet storage apparatus according to claim 9, wherein the first storage bag support and the second storage bag support are removable from the sheet storage apparatus, and the sheet storage apparatus further comprises a third storage bag support that is attachable and supports the bottom surface of the storage bag on a third supporting surface of the third storage bag support that is a single plane.

11. The sheet storage apparatus according to claim 10, wherein the control circuit performs the first movement control in a case where the third storage bag support is attached or when the second supporting surface has moved to a position on a same plane as the accumulating surface and the first supporting surface.

12. The sheet storage apparatus according to claim 10, further comprising:

a detector that detects whether a shape of the storage bag is in a first form or a second form, the first form being a form in which the back side in the storing direction is expanded from the front side, the second form being a form in which the front side and the back side in the storing direction have a same height, wherein the control circuit performs the first movement control in a case where the shape of the storage bag is detected to be in the second form.

13. The sheet storage apparatus according to claim 10, further comprising an operation unit where it is selectable whether to cause the control circuit to perform the first movement control or the second movement control.

14. A sheet storage apparatus, comprising:

a first storage bag support that supports a bottom surface of a storage bag;

a second storage bag support that is positioned on a back side of the storage bag from the first storage bag support in a storing direction, the second storage bag support supporting the bottom surface of the storage bag at a position lower than the first storage bag support;

a sheet support that supports a sheet to be stored in the storage bag so that the sheet is in an upright state, wherein the sheet is moved in the storing direction to the back side of the storage bag, and the storage bag is fixed so that the storing direction is horizontal or closer to horizontal than to vertical; and a control circuit that controls movement of the sheet support to a farthest back position within a movable range of the sheet support before the sheet is stored in the storage bag.

15. The sheet storage apparatus according to claim 14, further comprising a step between the first storage bag support and the second storage bag support.

16. The sheet storage apparatus according to claim 15, wherein the first storage bag support, the second storage bag support, and the step integrally form a single support.

17. The sheet storage apparatus according to claim 15, further comprising a sealing section that is placed on a front side from the step section in the storing direction and seals the storage bag.

18. The sheet storage apparatus according to claim 14, wherein the control circuit controls the movement of the sheet support based on a storage amount of the storage bag.

19. The sheet storage apparatus according to claim 18, wherein the control circuit controls movement of the sheet support to the farthest back position within the movable range of the sheet support when the sheet support reaches a predetermined position with respect to the first storage bag support in the storing direction.

* * * * *